(12) United States Patent
Williams (10) Patent No.: US 11,165,463 B1
(45) Date of Patent: Nov. 2, 2021

(54) SYSTEMS AND METHODS FOR BROADBAND SIGNAL EQUALIZATION

(71) Applicant: CABLE TELEVISION LABORATORIES, INC, Louisville, CO (US)

(72) Inventor: Thomas H. Williams, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/927,802

(22) Filed: Jul. 13, 2020

Related U.S. Application Data (60) Provisional application No. 62/873,584, filed on Jul. 12, 2019, provisional application No. 62/882,230, filed on Aug. 2, 2019.

(51) Int. Cl.
| | |
|---|---|
| *H04B 1/71* | (2011.01) |
| *H04B 1/7107* | (2011.01) |
| *H04B 1/10* | (2006.01) |
| *H04B 10/112* | (2013.01) |
| *H04B 1/12* | (2006.01) |

(52) U.S. Cl.
CPC ......... *H04B 1/7107* (2013.01); *H04B 1/1036* (2013.01); *H04B 1/1081* (2013.01); *H04B 1/123* (2013.01); *H04B 10/1127* (2013.01)

(58) Field of Classification Search
CPC .............. H04B 1/7107; H04B 10/1127; H04B 1/1036; H04B 1/123; H04B 1/1081
See application file for complete search history.

(56) References Cited

U.S. PATENT DOCUMENTS

| | | | | |
|---|---|---|---|---|
| 6,813,311 | B1* | 11/2004 | Pal | H04B 3/23 370/286 |
| 2002/0027957 | A1* | 3/2002 | Paulraj | H04L 1/06 375/267 |
| 2004/0213170 | A1* | 10/2004 | Bremer | H04L 5/16 370/282 |
| 2008/0104158 | A1* | 5/2008 | Farhoodfar | H03H 21/0027 708/405 |
| 2011/0007852 | A1* | 1/2011 | Kimata | H04L 25/03159 375/341 |
| 2011/0235500 | A1* | 9/2011 | Shenoi | H04J 3/0632 370/201 |

(Continued)

*Primary Examiner* — Jean B Corrielus
(74) *Attorney, Agent, or Firm* — Armstrong Teasdale LLP (57) ABSTRACT

An interference canceling subsystem for a bidirectional communications network includes an input interface configured to receive a first data signal from a first transceiver of the network, an output portion configured to receive a second data signal from a second transceiver of the network, a first signal path connecting the input interface to the output portion, a second signal path connecting the output portion to the input interface, and a first interference canceler disposed between the output portion and the input interface along the second signal path. The first signal path is configured to relay the first data signal from the input interface to the output portion. The interference canceler is configured to (i) relay the second data signal from the output portion to the input interface, and (ii) remove portions of the first data signal from the relayed second data signal prior to reaching the input interface.

20 Claims, 4 Drawing Sheets

(56) References Cited

U.S. PATENT DOCUMENTS

| | | | |
|---|---|---|---|
| 2016/0164572 A1* | 6/2016 | Choi | H04B 3/20 370/286 |
| 2018/0183629 A1* | 6/2018 | Pandey | H04L 25/03885 |
| 2019/0296791 A1* | 9/2019 | Walley | H04B 3/20 |
| 2020/0313840 A1* | 10/2020 | Den Besten | H04L 5/22 |

* cited by examiner

SYSTEMS AND METHODS FOR BROADBAND SIGNAL EQUALIZATION

CROSS REFERENCE TO RELATED APPLICATIONS

This application claims the benefit of and priority to U.S. Provisional Patent Application Ser. No. 62/873,584, filed Jul. 12, 2019, and to U.S. Provisional Patent Application Ser. No. 62/882,230, filed Aug. 2, 2019, the disclosures of all of which are herein incorporated by reference in their entirety.

BACKGROUND

The field of the disclosure relates generally to digital transmission systems, and more particularly, to multi-carrier wired, wireless, and optical digital transmission systems.

Conventional digital transmission systems often exhibit both linear and non-linear distortion. However, for the purposes of the following discussion, use of the term "distortion" generally refers to linear distortion only. Conventional digital transmission systems utilize symbols with coefficients, either in the time domain (TD) or frequency domain (FD), which are generally complex-value sequences. That is, the coefficients of the complex symbols typically include both a real component and an imaginary component, or alternatively, a magnitude and a phase value. The time and frequency domains are related, and some of the embodiments below, the two domains may be considered duals of each other. That is, for a plot or a sequence of numerical values, it must be known whether to observe the plotted numbers as time domain or frequency domain values.

This distinction is of particular significance when considering multi-carrier (MC) digital transmissions, such as with orthogonal frequency division multiplexing (OFDM) and orthogonal frequency division multiple access (OFDMA) transmissions. OFDM symbols, for example, when plotted, appear as discrete values in the frequency domain, but look more like random noise in the time domain. In contrast, if a transmission is single carrier (SC), its symbols can be viewed as discrete values in the time domain, but look like random noise in the frequency domain. Multi-carrier and single carrier transmissions are thus typically viewed in different domains.

One type of interference/distortion that severely affects digital transmissions is multipath linear distortion, which is sometimes referred to as "echoes," "ghosts," or "dispersion." The following discussion uses "echoes." An example of an echo distortion occurs when a data transmission (e.g., a baseband radio frequency (RF) signal) is sent over a direct path between a transmitter and a receiver, but is also reflected off at least one object or impedance mismatch outside of the direct path. In such cases, the receiver receives the main signal of the direct path, but also a reflection, or the echo, of the signal over the indirect reflection path. These echoes arising from reflections combine with the main signal over the direct path, and thereby cause distortion in the received signal.

On wired signal paths, echoes may also occur from impedance mismatches within coaxial networks, such as in the case where one or more copies of the original signal, which may include a delay and/or an attenuation, are added to the original signal. In comparison, on wireless signal paths, multipath linear distortion may arise from signals reflected from physical structures. In the case of single mode fiber optic coherent optical signals, transmission characteristics differ from RF wired and wireless signal paths. In single mode glass fiber, for example, Chromatic Dispersion (CD) impairments, similar to group delay, may occur lower frequencies, since signals at different frequencies (e.g., optical wavelengths) travel at different speeds down the fiber optic cable and the linear distortion therefrom is equalized to minimize inter-symbol interference (ISI). This impairment becomes more pronounced with longer fiber optic cable spans and increasing bandwidth, and is different from echoes, which are not typically encountered on fiber optic transport media. The following description broadly refers to all of these distortions and impairments collectively as "interference(s)."

Furthermore, the cost of transporting a Gigabit (Gb) of data per km is less expensive over optic cable than over coaxial cable. However, RF wireless transport is considered to be the most expensive data transport medium, due to the fact that RF bandwidths are sold or licensed and shared, and also because wireless data transport is often the preferred method for untethered connectivity. Accordingly, given this disparity in the cost of data transport, it is desirable to develop a hybrid fiber coaxial (HFC) transmission system that better able to able to steer more "waste" toward the optical bits sent over the fiber, in order to advantage transmission of the coaxial bits sent over the wired cable. For example, for data bits piped into an analog-to-digital converter (ADC), approximately 30% of the input bits to the converter are recovered as information bits output to an analog receiver. A similar recovery efficiency holds for a digital-to-analog converter (DAC).

Additionally, there is a need in the industry to develop improved broadband adaptive equalizers to reduce inter-symbol interference on data transmissions, and also a need to clean the signal path to better enable bidirectional amplification, particularly in the case of Full Duplex (FDX) transmission systems. FDX amplifiers without effective equalization exhibit undesirable frequency responses, and with sufficient feedback, the FDX amplifiers may break into an undesirable state of oscillation. Conventional amplification approaches, for example, which use time-domain equalization components, such as finite impulse response (FIR) filters, are considered considerably expensive and power-hungry due to the number of taps required and the considerably-high requisite clocking speeds. Conventional field programmable gate arrays (FPGAs) have recently been proposed to substitute for the higher-cost application specific integrated circuits (ASICs). Other conventional proposals perform equalization by frequency domain equalization (FDE) techniques.

These conventional FDE techniques, however, requiring use of a cyclic prefix (CP), or guard interval, interposed between symbols, which uses a significant amount of the data transport, and which also does not address echoes, reflections, or other interferences that variably distort the data beyond the link for which the CP is able to compensate. Moreover, random data traveling over a broadband signal path generally does not require a CP for conventional FD equalization. Advantageous solutions to such CP limitations are disclosed in U.S. Pat. No. 10,476,631 to the present inventor, the disclosure thereof which is incorporated by reference herein in its entirety. This patent describes advantageous systems and methods that enable successful elimination of ISI and reflection distortion through efficient signal equalization techniques that may be implemented with or without a CP.

It is therefore desirable to build upon these successful techniques to develop simpler and less costly amplification capability, and also further improve equalization techniques and hardware to efficiently remove or cancel undesirable interferences along the signal path.

BRIEF SUMMARY

In an embodiment, an interference canceling subsystem is provided for a bidirectional communications network. The subsystem includes an input interface configured to receive a first data signal from a first transceiver of the bidirectional communications network, an output portion configured to receive a second data signal from a second transceiver of the bidirectional communications network, and a first signal path connecting the input interface to the output portion. The first signal path is configured to relay the first data signal from the input interface to the output portion. The subsystem further includes a second signal path connecting the output portion to the input interface, and a first interference canceler disposed between the output portion and the input interface along the second signal path. The interference canceler is configured to (i) relay the second data signal from the output portion to the input interface, and (ii) remove portions of the first data signal from the relayed second data signal prior to reaching the input interface.

In an embodiment, an equalization subsystem is provided for a bidirectional communications network transporting a first data signal along an optical transport medium in a first direction and second data signal along the optical transport medium in a second direction opposite the first direction. The subsystem includes a first interface configured to receive the first data signal in the first direction from the bidirectional communications network and output the second data signal in the second direction to the bidirectional communications network. The subsystem further includes a second interface configured to receive the second data signal in the second direction from the bidirectional communications network and output the first data signal in the first direction to the bidirectional communications network. The subsystem further includes a first amplifier configured to amplify the first data signal prior to output in the first direction to the bidirectional communications network, a second amplifier configured to amplify the second data signal prior to output in the second direction to the bidirectional communications network, and an equalizer disposed between the first interface and the second interface. The equalizer is configured to (i) remove portions of the first data signal from the second data signal prior to amplification by second amplifier, and (ii) remove portions of the second data signal from the first data signal prior to amplification by first amplifier.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but may also broadly refer to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, unless specified to the contrary, "modem termination system," or "MTS'" may refer to one or more of a CMTS, an optical network terminal (ONT), an optical line terminal (OLT), a network termination unit, a satellite termination unit, and/or other termination devices and systems. Similarly, "modem" may refer to one or more of a CM, an optical network unit (ONU), a digital subscriber line (DSL) unit/modem, a satellite modem, etc.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

The embodiments described herein provide innovative systems and methods for signal equalization performed, for example, by capturing symbols of a received data stream. In an exemplary embodiment, equalization is performed at a fiber node of an HFC network. In some embodiments, equalization is performed between a hub MTS and an end-user modem by a distinct dedicated hardware unit, or virtually through a software module programmed for, or associated with, a processor of either component of the system.

In an embodiment, a remote fiber node includes an ADC and a DAC for converting optical fiber signals to and from RF coaxial signals. The present systems and methods further provide an innovative interference canceler to remove transmitted signals from received signals in a bidirectional system. In this context, the terms "transmitted" and "received" are relative, and are used as a convenience to distinguish one transceiver communicating over a single fiber from another transceiver at the other end of the fiber.

The embodiments herein thus provide versatile communication system elements that are effectively agnostic to the type of signal being transmitted, and which may therefore advantageously operate in either Time Division Duplex (TDD) or Frequency Division Duplex (FDD) mode. The embodiments herein may further be implemented as a stand-alone system, or as a complementary subsystem that is backwards-compatible with conventional communication systems and hardware. In an exemplary embodiment, an interference canceler efficiently implements FDE without the need for CPs. In some embodiments, the interference canceler further includes capability to be trained, which may be of particular utility where the interference canceler is implemented using remote processing.

Interference Cancelation

In an embodiment, the present systems and methods are operable with respect to OFDM and OFDMA signals through wired and wireless channels without the need to consider or create CPs, but may still advantageously eliminate interferences, including linear distortion, such as an echo. The training capability of the interference canceler may include programming utilizing pilot subcarriers or training-synchronization signals, such as a constant amplitude zero autocorrelation (CAZAC) signals. In at least one embodiment, a Zadoff Chu sequence functions as the training-synchronization signal.

According to an exemplary embodiment, a significantly less complex interference canceling subsystem is provided. In comparison with conventional techniques, the subsystem is lower-cost, signal-agnostic, more flexible, more energy-efficient, and is capable of direct application in not only conventional optical communication systems, but also in the newly emerging advanced optical communications innovations, including, for example, coherent optical communications and coherent FDX bidirectional networks, and also for wireless applications, including without limitation radar, signal detection, and interference signal rejections. In an embodiment, the interference canceler processes signals in the frequency domain to provide efficient removal of a transmitted signal from a received co-band signal. In the exemplary embodiment, latency is low, since long echoes that may increase latency are infrequent.

The following embodiments are described below with respect to optical networks and systems for which equalization is performed. The person of ordinary skill in the art will understand that these examples are provided for illustrative purposes, and are not intended to be limiting. The present interference cancelation and equalization techniques may be applied to a number of other applications, including without limitation, wired communications (e.g., cable or fiber, wired MIMO), wireless (e.g., radar, wireless MIMO), recording, signal detection, and interfering signal rejection.

Figure 1:
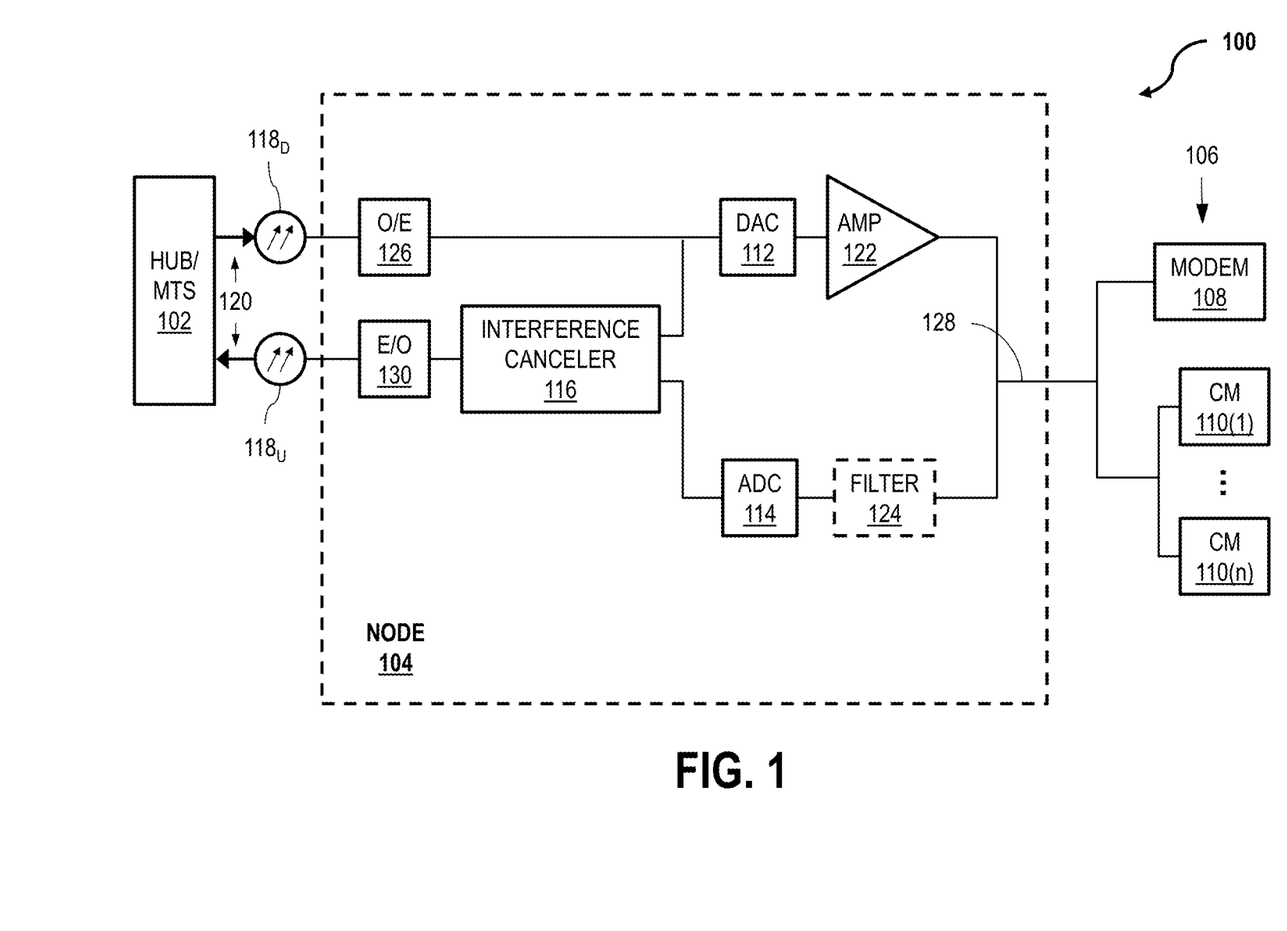
FIG. 1 is a schematic illustration depicting an exemplary transmission system.

FIG. 1 is a schematic illustration depicting an exemplary transmission system 100. In an exemplary embodiment, system 100 is an HFC network, and includes an optical hub 102, a fiber node 104, and a plurality of end users 106. Optical hub 102 is, for example, a central office, a communications hub, or an optical line terminal (OLT), and includes at least one MTS (not separately numbered). In the embodiment depicted in FIG. 1, fiber node 104 may be implemented within a passive optical network (PON). End users 106 represent downstream termination units, including without limitation, one or more of a customer device, customer premises (e.g., an apartment building), a business user, and/or an optical network unit (ONU), depicted in FIG. 1 as at least one modem 108 and one or more cable modems (CMs) 110 (i.e., 1-n CMs).

In the exemplary embodiment, fiber node 104 includes an advantageously simplified architecture for communicating with modems 108 and/or CMs 110 (collectively referred to herein as modems), or the downstream termination units of end users 106 utilizing a DAC 112 and an ADC 114. Node 104 further includes an interference canceler 116. In at least one embodiment, interference canceler 116 enables FDX operation over at least a portion of the band in which a downstream optical signal $118_D$ and an upstream optical signal $118_U$ are transmitted over an optical transport medium 120, e.g., a single mode fiber (SMF). In some embodiments, interference canceler 116 is an echo canceler, such as in the case of a wired network where it is desirable to remove the delayed symbols of a particular signal. In other embodiments, interference canceler 116 may operate for wireless communications where the interference signal for which removal is desired is a reflection.

In an exemplary embodiment, interference canceler 116 operates to cancel bleed-over signals from different signals communicated along the same transport medium. For example, in the case where a signal changes a direction along a medium (or two signals transported in opposite directions), an echo in one direction becomes an interference signal with respect to a signal in the opposite direction. That is, an echo of a "downstream" signal becomes an "upstream" signal in the wired paradigm since, for wired applications, there are generally only two directions for a signal to travel. In contrast, in a wireless environments, the number of interference signals and directions may be many, and theoretically infinite. For ease of explanation, the present example is described with respect to a two-way wired environment. In an embodiment, DAC 112 includes an amplifier 122 to boost the converted analog signal prior to reception by end users 106. In an optional embodiment, a filter 124 is disposed before ADC 114 to protect ADC 114 from overload. In the case where filter 124 is provided, filter 124 may be configured to be switchable.

In exemplary operation of system 100, digital downstream optical signal $118_D$ is transmitted from hub 102, and then first converted into an electrical signal by an optical-electrical (O/E) interface 126, and then into an RF transmit signal by DAC 112. In the example depicted in FIG. 1, DAC 112 is a wideband converter, and amplifier 122 is an RF amplifier. Accordingly, in an exemplary case of a 1.8 GHz signal, where the symbol rate is approximately 4 Gigasymbols/sec, the raw data rate would be approximately 40 Gigabits/sec (Gps) taken at 10 bits/symbol. RF amplifier 122 thus boosts the converted RF signal for transmission to multiple modems (e.g., modems 108, 110), for example, over a 2-way coaxial transport medium 128. According to this exemplary configuration and operation, the converted RF signal may be according to any one of the TDD, FDD, FDX, and other transmission protocols.

In further exemplary operation of system 100, the upstream signal frequencies transmitted from modems 108, 110 may also be transmitted according to one or more of the TDD, FDD, FDX, or other communications protocols simultaneously. That is, the separate upstream signals from the respective devices may use the same transmission protocol, or different protocols from one another. In further operation, these upstream signals arrive from the plurality of end user devices into ADC 114, and converted into a digital signal that is provided to interference canceler 116 prior to conversion into upstream optical signal $118_U$ by an electrical-optical (E/O) interface 130.

Accordingly, due to the back reflections caused by plant return loss and launch coupler isolation, the signal received at ADC 114 may be contaminated by the signal transmitted from amplifier 122 in the same band. Interference canceler 116 thus functions to remove from the upstream signal this contamination by the downstream signal. In the exemplary embodiment, interference canceler 116 implements one or more of the FDE techniques disclosed by U.S. Pat. No. 10,476,631 according to its own sub-processor, or alternatively, in cooperation with a remote processor with which interference canceler 116 may be communicatively coupled.

System 100 further improves upon these techniques by enabling interference canceler 116 to selectively discriminate, on a frequency band-by-band basis, between the different respective upstream transmissions from modems 108, 110. That is, in the case where interference canceler 116 is unable to sufficiently remove an interference, echo, bleed-over signal, or contamination from the individual band of a particular upstream modem transmission, system 100, node 104 and/or interference canceler 116 may be further configured to prevent, or "kill", that upstream transmit signal from being sent to hub 102. For example, in a case where interference canceler 116 is unable to sufficiently decontaminate the transmit signal from CM 110(1), echo canceler 116 may selectively block the band of that signal from traveling to hub 102, while allowing uncontaminated or decontaminated transmit signals from modem 108 and CM 110(n) to pass through.

The versatility of this simplified node architecture enables these innovative techniques to be implemented easily into, or in coordination with, existing fiber node structures or operation with minimal additional hardware and programming costs. System 100 may therefore advantageously function as a standalone system, or may be fully backwards-compatible with existing modem and MTS hardware presently used in this field.

As explained in greater detail below, the interference canceling techniques of system 100 are also fully compatible with burgeoning FDX operation principles. The simplified hardware architecture of system 100 is split-agnostic, and therefore is fully operable with the FDX amplifier embodiments described herein, including FDX operation in the 108-684 MHz band, and also with the extended spectrum of the Data Over Cable Service Interface Specification (DOCSIS). In some embodiments, demodulation of the digital-to-analog and analog-to-digital signals may be performed remotely at an MTS (or virtual MTS), which may be particularly desirable where the cost-benefits weigh in favor of a protected environment (e.g., at hub 102) where it is reasonably possible to maintain and control a benign temperature, security, humidity, and the potential for electric surge. Remote demodulation at the MTS may be further advantageous, in that equipment upgrades may be easily performed at a central location without requiring technician travel to the field.

System 100 provide still further advantages over conventional techniques by, in addition to being relatively low-cost and energy-efficient, enabling interference cancellation that is agnostic to the type signal being transmitted, particularly in the case where a plurality of respective modems transmit different signal types upstream simultaneously. That is, the interference canceling techniques of system 100 enable the interference canceler (e.g., interference canceler 116) to be trained such that, once so trained, the interference canceler is able to effectively decontaminate any type of signal from a modem.

In at least one embodiment, in the case of bands where the FDX N+0 proposition fails due to insufficient interference canceler performance, system 100 may be further advantageously implemented to operate in a non-FDX mode, such as either of the TDD mode and the FDD mode, or even a wireless mode (i.e., in the case of a wireless implementation.

Accordingly, system 100 is further capable of utilizing uneven splits for signal coupling, for example, a 6 dB directional coupler. According to this simplified architecture, node 104 may include sufficient processing capability to perform all of the functionality described herein, or may be require less hardware complexity and be remotely controlled over a reliable transport medium. Additionally, through the capability of performing interference cancellation on a band-by-band basis, system 100 is enabled to decontaminate upstream from downstream signals more efficiently, without experiencing service interruptions.

Interference Canceling Amplification

The preceding embodiments are described above with respect to FDE techniques that eliminate the need for CPs (e.g., using overlapped Fourier transforms, etc.) for illustrative purposes, and not in a limiting sense. That is, in the case where CPs are not required, an equalizer may perform the desired FDE processing without having to perform the rest of the signal demodulation processing. However, the present embodiments may also be implemented using equalization techniques that utilize CPs. Nevertheless, for ease of illustration, following embodiments are described with respect to the advantageous techniques disclosed in U.S. Pat. No. 10,476,631, where the equalized output stream is easily reconstructed as a clean equalized RF data stream output, instead of the conventional form of received data (i.e., bits and bytes). Whereas this previous patent describes efficient FDE processes for demodulation purposes, the systems and methods described herein expand these principles to other applications to implement computationally-efficient equalization for a variety of broadband signals. An exemplary processing technique for a received data signal is described further below with respect to FIG. 2.

Figure 2:
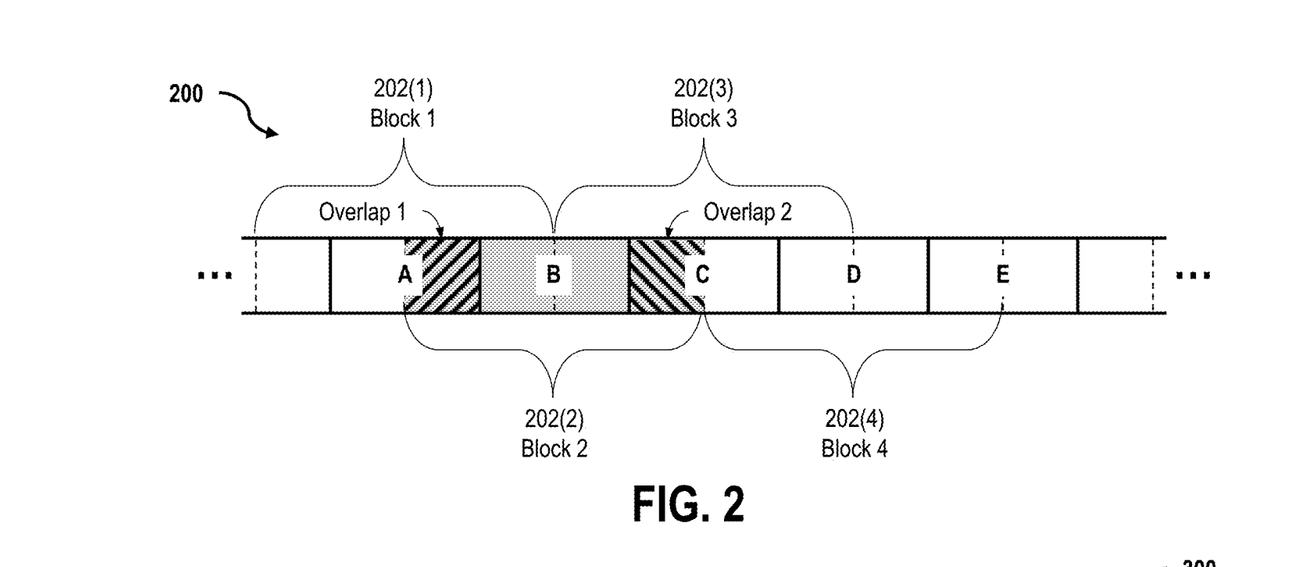
FIG. 2 is a graphical illustration depicting a broadband data signal in the time domain.

FIG. 2 is a graphical illustration depicting a broadband data signal 200 in the time domain. In the embodiment illustrated in FIG. 2, signal 200 is depicted as a time sequence of a broadband data signal at baseband, captured as a double sideband signal at RF. In this example, signal 200 includes a plurality of complex I-Q (i.e., In-phase and Quadrature) samples, time-sequenced to be broken into contiguous signal segments A, B, C, D, E.

In exemplary operation, a first processing block 202(1) may be created from the trailing (in time) half of the segment (not individually labeled) preceding signal segment A, all of signal segment A, and the leading half of signal segment B. In this example, half-segments are described for ease of illustration, and not in a limiting sense. Similar to the principles described in U.S. Pat. No. 10,476,631, the leading and trailing portions of contiguous segments may be of different sizes. In a similar manner, a second processing block 202(2) may be created from the trailing half of signal segment A, all of signal segment B, and the leading half of signal segment C, a third processing block 202(3) from the trailing half of signal segment B, all of signal segment C, and the leading half of signal segment D, and a fourth processing block 202(4) from the trailing half of signal segment C, all of signal segment D, and the leading half of signal segment E. In an exemplary embodiment, overlapped Fourier transforms may be utilized used to equalize first, second, third, and fourth processing blocks 202(1), 202(2), 202(3), and 202(4), respectively.

In further exemplary operation, processing of the overlapped blocks 202(1), 202(2), 202(3), and 202(4) effectively eliminates the overlapping portions from contiguous segments, and only outputs the respective A, B, C, and D segment portions from each block 202 without the overlapping portions of contiguous segments. In an exemplary embodiment, signal 200 may be processed as two separate signal chains, such that, while one signal chain is processing the "even" blocks (i.e., processing blocks 202(2), 202(4), etc.), the "odd" blocks (i.e., processing blocks 202(1), 202(3), etc.) may be processed by another signal chain.

In the exemplary embodiment depicted in FIG. 2, with respect to signal segment B, the block sizes are selected such that that the overlapped portions, Overlap1 and Overlap2, surrounding signal segment B are longer than the longest echo anticipated. In most cases of a cable plant, the longest anticipated echo would normally have a duration no longer than a few microseconds. Accordingly, after initial processing of processing blocks 202(2), Overlap1 and Overlap2 may be discarded, and the relevant data from signal segment B may then be output and equalized. Similar techniques are implemented for the other processing blocks 202.

In some embodiments, the complex I-Q samples of data signal 200 represent OFDM subcarriers. In conventional systems, digital data from the hub that is received at an ADC of a fiber node may create blocks of downstream RF digital signals that can be tuned by any terminal device (e.g., NTSC analog TV sets, FM radio signals, DOCSIS signals, digital video signals, etc.). However, for every RF digital bit received by such end user home devices, approximately three digital link bits must be originally sent from the hub. In order to supply 1 GHz of analog bandwidth using a DAC (i.e., having a high signal-to-noise ratio (SNR)), approximately 28 Gb/s are needed (or a symbol rate of 2.5 Gb/s, at 11 bits per symbol), which is outside of the desired range for inexpensive digital links (i.e., from the headend/hub to the fiber node), such as those limited to no greater than 10 Gb/s, or a 10 Gb digital link.

According to the present embodiments though, an adequate bandwidth may be supplied to a 10 Gb digital link by transmitting only the I-Q data necessary to build OFDM subcarriers. In an exemplary embodiment, 4096 (or 8192) subcarriers may be transmitted for each OFDM frame. In this example, all frequency-domain OFDM pilot signals, Phy Link Channel (PLC) subcarriers, modulation profiles, and forward error correction (FEC) may be sent as subcarrier complex values. If time-domain CPs or guard intervals are utilized, such may be generated locally within the fiber node. According to this example, approximately 10 Gb/s of user data payload is provided. In an exemplary embodiment, data signal 200 includes OFDM signals, since it will not generally be possible to generate arbitrary RF signals on the downstream. Such OFDM signals though, need not be according to the DOCSIS 3.1 standard.

The upside to this approach is that the hardware in the fiber node is really cheap and low power. It only needs to construct the OFDM carriers that are being received by the terminals in its service group. I envision 5 OFDM subcarriers of 192 MHz being constructed. D-A converter performance is easier to achieve than comparable A-D performance.

This approach works well for N+0 architectures where less than 100 subscribers share a fiber node.

Figure 3:
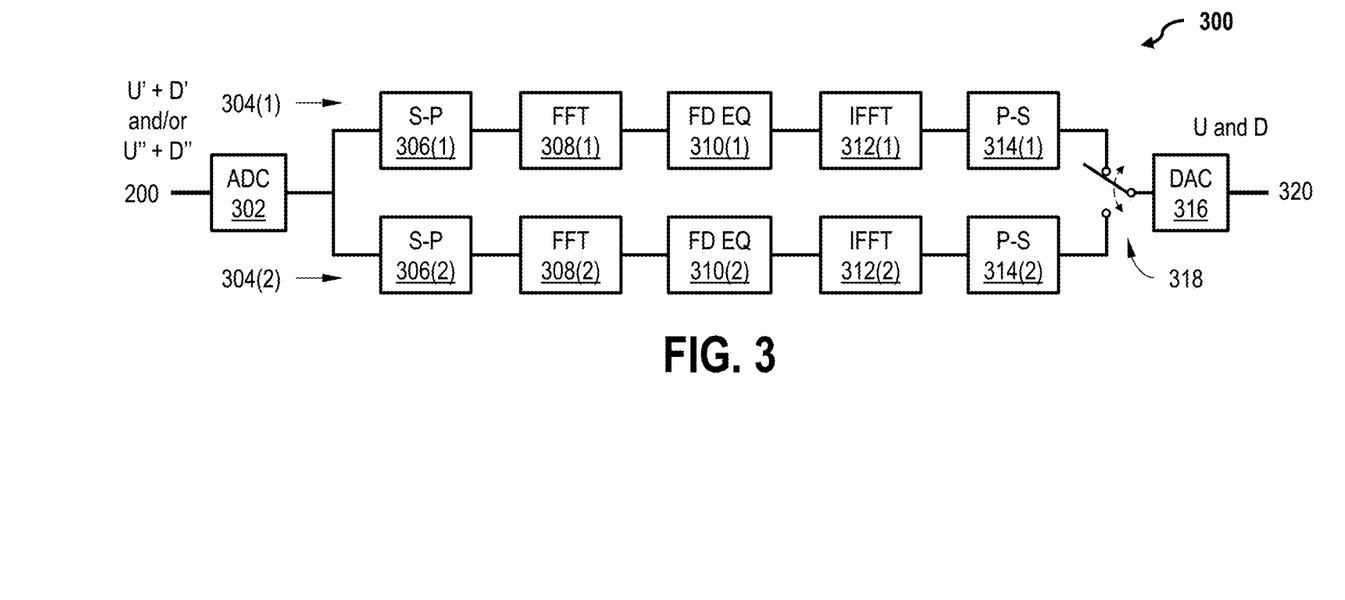
FIG. 3 is a schematic illustration depicting an exemplary equalization scheme for the data signal depicted in FIG. 2.

FIG. 3 is a schematic illustration depicting an exemplary equalization scheme 300 for data signal 200, FIG. 2. More particularly, in the exemplary embodiment depicted in FIG. 3, data signal 200 is received at an ADC 302, and the odd and even digital processing blocks (processing blocks 202, FIG. 2) output therefrom are then separately processed by separate odd signal processing chain 304(1) and even signal processing chain 304(2). In the exemplary embodiment, the processing architectures and orders of signal processing chains 304(1), 304(2) are substantially the same.

In an embodiment, each of signal processing chains 304(1), 304(2) includes one or more of a serial-to-parallel (S-P) converter 306, a fast Fourier transform (FFT) unit 308, an equalization unit 310 (e.g., configured for FDE), an inverse FFT (IFFT) unit 312, and a parallel-to-serial (P-S) unit 314. Outputs from respective P-S units 314 may then feed into a DAC 316. In this example, data signal 200 may represent a baseband signal stream, such as a baseband signal stream provided by a software defined radio (SDR).

In exemplary operation of scheme 300, data signal 200 is converted, at ADC 302, into a stream of serial digital symbols, two separate copies of which are then respectively supplied to substantially identical odd signal processing chain 304(1) and even signal processing chain 304(2). The respective series of symbols are then converted into parallel blocks by S-P converters 306 and then processed by FFT units 308. In an exemplary embodiment, the size of each parallel block from S-P converters 306 is selected to correspond to the size of the FFT performed by FFT units 308. In some embodiments, for ease of processing, the FFT size is a factor of two, raised to some integer power (e.g., 4096).

After the FFT is performed on the respective parallel blocks by FFT units 308, frequency domain equalization is performed on the transformed blocks by equalization units 310 to remove interferences, such as echoes. In an exemplary embodiment, for purposes of computational efficiency, FDE by equalization units 310 may be implemented using only a single complex multiplication factor for each frequency domain sample. In some embodiments, equalization coefficients utilized by equalization units 310 may be programmed according to a channel estimation method, for example, using a training signal, as described above. In at least one embodiment, the training signal may be or include a Zadoff-Chu sequence. Zadoff-Chu sequences, for example, contain low peak-to-average power ratios and lack the spectral holes that occur in other signals. In an alternative embodiment, blind equalization processes may be utilized, such as those for maintaining spectral flatness.

As described above, equalization becomes computationally difficult when a number of taps in an FIR filter becomes long, and where the FIR filter clocking rate is high. The present embodiments thus render the equalization processing much more efficient by converting the data into a frequency domain and performing FDE, followed by converting the equalized spectral data back into temporal data. Accordingly, no guard interval or CP is required for the signal being equalized, since a pseudo-extension of arbitrary duration (in the examples herein, half of the preceding and following blocks) may be inserted in the processing. The equalized data may then be utilized for a variety of applications, including without limitation, recording, demodulation, consumption, further processing, or elimination of interference from a desired signal.

After equalization by equalization units 310, the "middle" portion of each block (e.g., signal segments A, B, C, D, E, FIG. 2, excluding respective overlap portions from contiguous blocks) is converted back into the time domain by IFFT units 312 using an IFFT, and then converted back into a serial stream by P-S converters 314. The serial streams output by P-S converters 314 are then both output into DAC 316. In an exemplary embodiment, a switch 318 is disposed between DAC 316 and the serial outputs from P-S converters 314, and switch 318 functions to continuously select odd blocks (i.e., blocks 1 and 3), and then even blocks (i.e., blocks 2 and 4), for output to DAC 316, which produces a decontaminated signal stream 320. In the exemplary embodiment, both signal chains 304 are synchronous, and are configured to use a common clock for operation of switch 318.

In an embodiment, either signal processing chain 304 may accomplish FDE by first converting a time domain symbol sequence (e.g., from ADC 302 or S-P 306) into the frequency domain (e.g., by FFT 308), and then performing a single complex multiply operation on each frequency domain symbol (e.g., by equalization unit 310). If demodulation is desired, the equalized sequence may then be easily converted back into the time domain (e.g., by IFFT 312). This FDE technique thereby requires significantly less computational effort by an equalizer than conventional techniques, even considering the inclusion of both the FFT and IFFT operations. Conventional systems also typically require use of CP to execute this type of FDE, whereas a CP is not necessary according to the present systems and methods.

This reduction in computational effort is a significant advantage over conventional equalization techniques. A conventional system, for example, may encounter echoes having a delay ranging from 2-4 microseconds ($\mu$s). For a bandwidth range of 108-684 MHz (i.e., 576 MHz wide), the relevant symbol periods may be relatively short, at 1.7 nanoseconds (ns). The number of taps required to cancel an echo of 2 (i.e., 2000 ns) would therefore have to exceed 1176-1177 taps (i.e., 2000/1.7=1176.5), and clocked at a very high rate. The processor performing such equalization would require a considerably expensive, power-hungry equalization chip (e.g., FPGA). The computational efficiency of the single complex multiply operation of the present embodiments, on the other hand, greatly reduces the computational effort in comparison with these conventional techniques.

Figure 4:
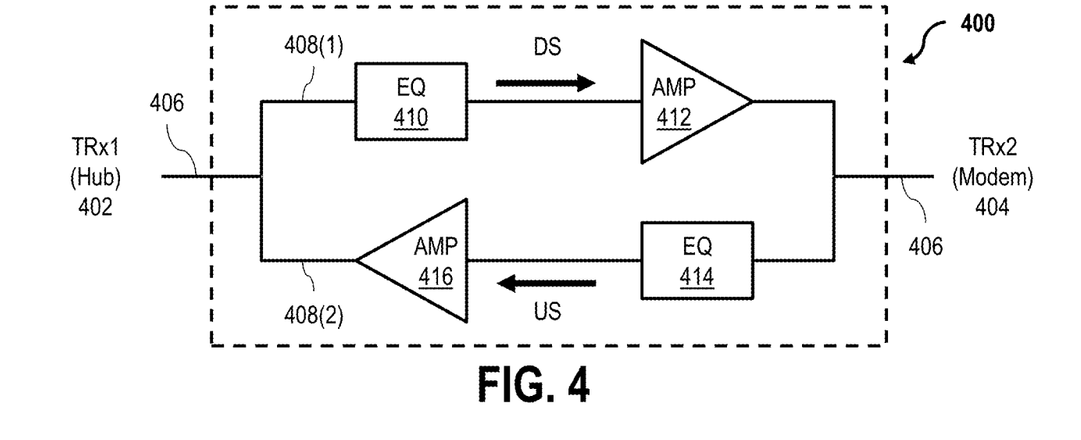
FIG. 4 is a schematic illustration depicting an exemplary amplifier architecture.

FIG. 4 is a schematic illustration depicting an exemplary amplifier architecture 400. In an exemplary embodiment, architecture 400 may be configured for use as an FDX amplifier, such as for a bidirectional coherent FDX network, where terms such as "upstream" and "downstream" are relative to the particular transceiver at either side of the single optical fiber, and used merely as convenient reference terms, or as consistent reference terms with respect to implementation within existing PONs architectures upgraded to FDX operation. In other embodiments, architecture 400 is applicable to a variety of broadband equalization implementations.

In the exemplary embodiment, architecture 400 is disposed between a first transceiver 402 and a second transceiver 404 and in operable communication with an optical fiber 406, respective ends of which are coupled with first and second transceivers 402, 404. Within architecture 400, directional data streams from transceivers 402, 404 are separated into first signal path 408(1) and second signal path 408(2), which are respectively labeled "DS" and "US" for ease of explanation, and not in a limiting sense. First signal path 408(1) includes a first equalizer 410 and a first amplifier 412, and second signal path 408(2) includes a second equalizer 414 and a second amplifier 416.

In the case where architecture 400 is applied to a coherent FDX network, first and second signal paths 408(1), 408(2) may be separated, for example, according to one or more of the exemplary architectures and techniques described in U.S. Pat. No. 10,658,989 to the present inventor, the disclosure of which is incorporated by reference herein in its entirety. System 400 improves upon these exemplary systems and methods enabling full demodulation, equalization, and retransmission of both of the upstream and downstream signals bidirectionally. In an exemplary embodiment, one or both of first equalizer 410 and second equalizer 414 may be configured to implement equalization scheme 300, FIG. 3.

Figure 5:
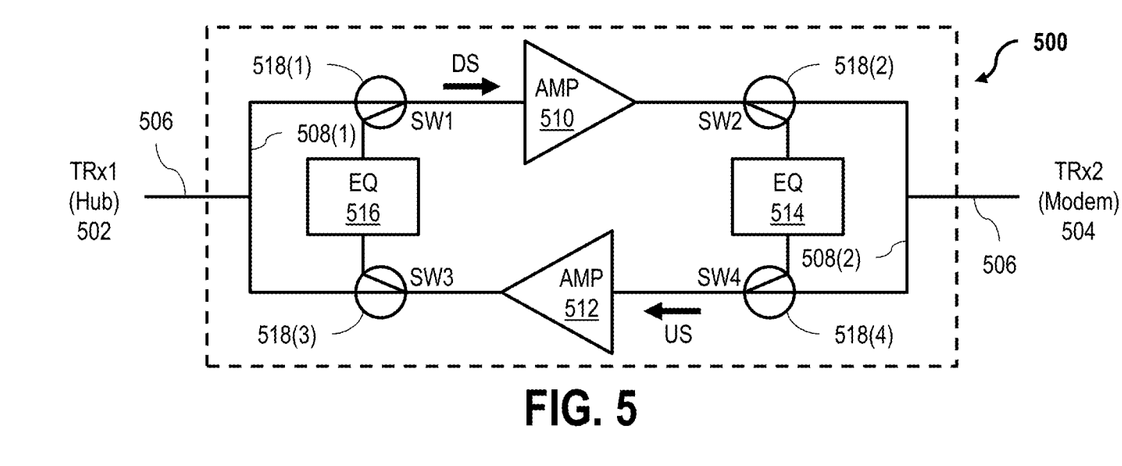
FIG. 5 is a schematic illustration depicting an alternative amplifier architecture.

FIG. 5 is a schematic illustration depicting an alternative amplifier architecture 500. In an exemplary embodiment, architecture 500 is similar to architecture 400, FIG. 4, and is similarly disposed between a first transceiver 502 and a second transceiver 504, in operable communication with an optical fiber 506 therebetween, and having directional data streams from transceivers 502, 504 separated into first signal path 508(1) and second signal path 508(2). Also similar to architecture 400, first signal path 508(1) includes a first equalizer 510 and second signal path 508(2) includes a second amplifier 512.

Different from architecture 400, in the embodiment depicted in FIG. 5, architecture 500 includes a first equalizer 514 and a second equalizer 516, but first and second equalizers are operatively coupled in parallel with first and second signal paths 508(1), 508(2), instead of individually in series with respective first and second amplifiers 510, 512. More particularly, in the exemplary embodiment, architecture 500 represents an FDX amplification system where the respective outputs of first and second amplifiers 510, 512 may be sampled and equalized by first amplifier 514 and second equalizer 516, respectively, and then fed back into the input of the other amplifier to effectively cancel any back-reflection along the respective signal paths 508. In some embodiments, management of the equalization feedback is controlled by a plurality of switches 518 disposed between an input or output of one of first and second equalizers 514, 516 and a respective input or output of first and second amplifiers 510, 512. In some embodiments, one or both of first and second equalizers 514, 516 may also operate according to equalization scheme 300, FIG. 3, and may be synchronized to operate according to a common clock signal.

Figure 6:
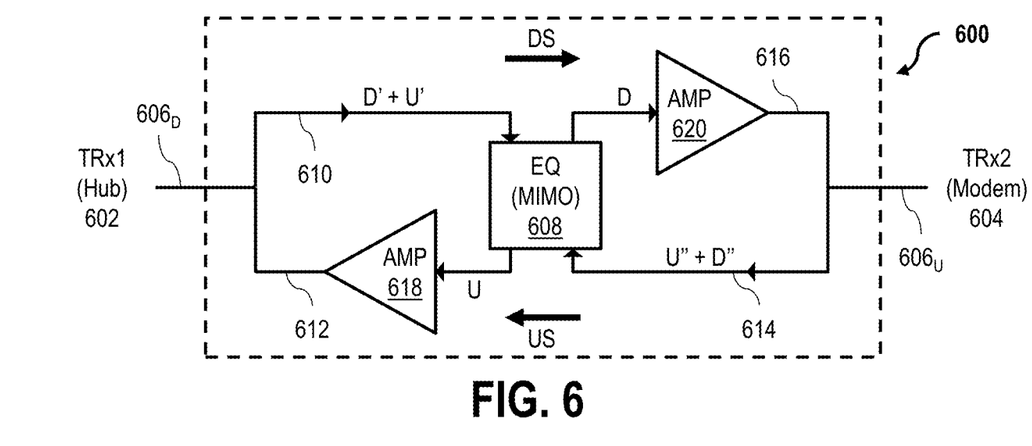
FIG. 6 is a schematic illustration depicting an alternative amplifier architecture.

FIG. 6 is a schematic illustration depicting an alternative amplifier architecture 600. In an exemplary embodiment, architecture 600 is similar to architecture 400, FIG. 4, and is similarly disposed between a first transceiver 602 and a second transceiver 604, in operable communication with an optical fiber 606 therebetween, and may represent an FDX amplification system configured such that both a downstream signal DS and upstream signals US may be fully demodulated, equalized, and then re-transmitted to the opposing transceiver.

Architecture 600 differs though, from architecture 400, in that architecture 600 is configured to perform one or more of the equalization techniques described above through a single multiple-input/multiple-output (MIMO) equalizer 608. In an exemplary embodiment, the directional data streams from and to first transceiver 602, e.g., at a downstream end of fiber 606 (i.e., fiber 606$_D$) are separated into a first transmit signal path 610 feeding into MIMO equalizer 608 and a first receive signal path 612 output from MIMO equalizer 608. In a similar manner, the directional data streams from and to second transceiver 604, e.g., at an upstream end of fiber 606 (i.e., fiber 606$_U$) are separated into a second transmit signal path 614 feeding into MIMO equalizer 608 and a second receive signal path 616 output from MIMO equalizer 608.

In the exemplary embodiment, a first equalizer 618 is disposed along first receive signal path 612 for the upstream signals US, and a second equalizer 620 is disposed along second receive signal path 616 for the downstream signals DS. In the example depicted in FIG. 6, equalizer 608 is illustrated as a 2×2 MIMO system, similar in some respects to a MIMO transmitter antenna/array such as that used in wireless applications. Within architecture 600 though, the downstream signal DS that is input to equalizer 608 from first transmit path 610 will include some contamination or bleed over from the amplified upstream signal US (collectively labeled in FIG. 6 as D'+U'). Similarly, the upstream signal US that is input to equalizer 608 from second transmit signal path 614 will include some contamination or bleed over from the amplified downstream signal DS (collectively labeled in FIG. 6 as D"+U"). Nevertheless, from both respective inputs to equalizer 608, clean upstream (i.e., "U") and downstream (i.e., "D") signals may be extracted by equalizer 608 prior to amplification by amplifiers 618, 620, respectively. Where architecture 600 is implemented into a wireless communication system, MIMO equalizer 608 may represent a MIMO antenna array, or a component thereof.

In some embodiments, MIMO equalizer 608 may be further configured to separately process and equalize a mixture or aggregate of signals from the respective transmitter portions of multiple transceivers located at the same respective end of fiber 606. In other embodiments, the input signals received from first and second transmit signal paths 610, 614 may represent a number N of repeated signals, and/or the separated copies of N different mixed signals from different transmit sources.

Additionally, in one or more of the architectures 400, 500, 600 depicted in FIGS. 4-6, respectively, it may be desirable to also implement audio-type equalization within, or in series with, the several equalizers described above, which may be particularly advantageous in the case where significantly longer echoes may be potentially encountered, and the size/duration of respective contiguous signal segments (e.g., signal segments A-E, FIG. 2) may render impractical the selection of the size of overlapping portions. For example, some echoes may potentially be longer than the duration of an entire contiguous signal segment.

Alternatively, or additionally, the overlapping portions, which are sometimes referred to as pseudo-extensions, may be dynamically adjustable based on the actual duration of an encountered interference or expected echo, and/or implement windowing techniques to select, dynamically or in a predetermined manner, the size of one or both of the signal segments and the overlapping portions or pseudo-extensions. All such techniques may be advantageously amended irrespective of whether the data signal includes a CP portion. Nevertheless, where it is desirable to eliminate the need for a CP, Zadoff-Chu sequences may be considered particularly useful as training sequences to render the respective component universally capable of handling any type of signal encounters.

In at least one embodiment, architectures 400, 500, or 600 may be implemented such that equalized amplification is performed only in the downstream direction, and not in the upstream direction. That is, architecture 400 may optionally exclude second amplifier 416, architecture 500 may optionally exclude second amplifier 512, and architecture 600 may optionally exclude first amplifier 618. The several processing techniques described herein may, for example, be performed using a general-purpose computing device, such as a computer operating in coordination with a fiber node (e.g., node 104, FIG. 1) or an amplification architecture (e.g., architectures 400, 50), 600, FIGS. 4-6). Alternatively, or additionally, several of the processing techniques described herein may be performed by a dedicated or specifically-programmed processor, such as an ASIC or an FPGA, which may be an integral component of the respective node or amplification architecture, or may operate remotely from the respective component, but in communicative coordination therewith.

Figure 7:
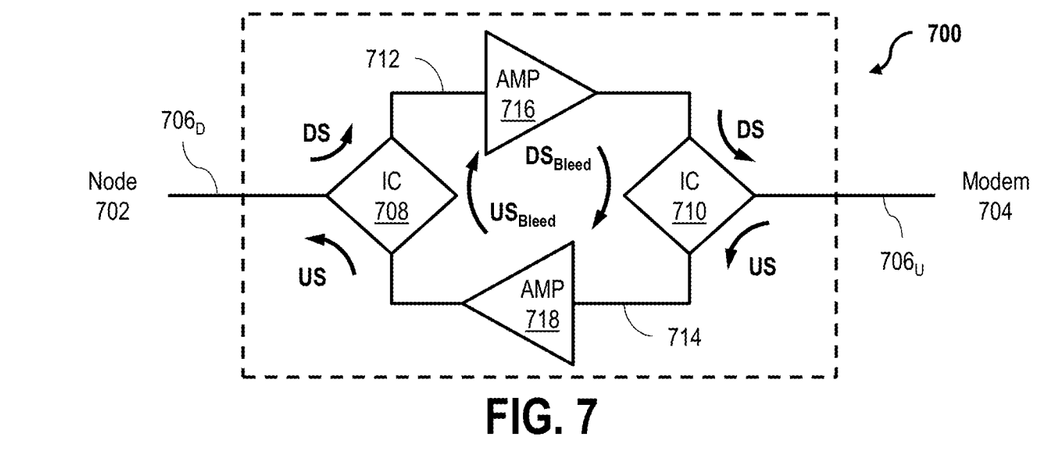
FIG. 7 is a schematic illustration depicting a full duplex amplifier architecture.

FIG. 7 is a schematic illustration depicting an FDX amplifier architecture 700. In the exemplary embodiment depicted in FIG. 7, architecture 700 represents a structural configuration similar to the internal architecture depicted with respect to node 104, FIG. 1, but in a simplified form for ease of explanation. That is, in the embodiment depicted in FIG. 7, architecture 700 is shown to be disposed between the node 702 and a modem 704 in communication with respective opposing ends of an optical fiber 706 coupled with node 702 and modem 704, but may include or be compatible with one or more of the several other node components (e.g., ADC, DAC, filter, E/O, O/E, etc.) illustrated in FIG. 1. In the exemplary embodiment, a first interference canceling unit 708 is disposed at the downstream end of optical fiber 706 (depicted in FIG. 7 as $706_D$), and a second interference canceling unit 710 disposed at the upstream end of optical fiber 706 (depicted in FIG. 7 as $706_U$).

First and second interference cancelers 708, 710 thus advantageously function to split the respective directional data streams from node 702 and modem 704 into a first, downstream signal path 712 and a second, upstream signal path 714. In an exemplary embodiment, a first amplifier 716 is serially disposed in first, downstream signal path 712, and a second amplifier 718 is a serially disposed along second, upstream signal path 714. This configuration, interference cancelers 708, 710 function, at least in part, as gatekeepers to the respective first and second signal paths 712, 714. Architecture 700 thus differs from architecture 100, FIG. 1, in that whereas node 104 includes a single interference canceler 116 and a single amplifier 122, architecture 700 is configured to include a two separate interference cancelers 708, 710 as well as two separate amplifiers 716, 718. This alternative configuration significantly improves the ability of architecture 700 to be fully implemented for an FDX network, and particularly within a coherent FDX network.

Architecture 700 is subject to a number of unique considerations. For example, the double-amplifier loop configuration of architecture 700 exhibits a gain in both of the DS and US signal directions simultaneously. In an exemplary embodiment, therefore, the architecture components are configured such that the gain around the loop is less than 1, and in some cases, substantially less than 1. If the gain around the loop (e.g., from impedance mismatches) is greater than 1, architecture 700 will become an oscillator, which is not desirable for the intended application. Additionally, the loop allows a bleed over portion of the downstream signal DS (i.e., $DS_{Bleed}$) to contaminate the upstream signal US coming from modem 704, and a similar bleed over portion of the upstream signal US (i.e., $US_{Bleed}$) to contaminate the downstream signal received from node 702. Each of these undesired bleed signal portions will then also be subject to amplification from the amplifier of the other signal path.

Accordingly, this bleed over effect may be sufficiently addressed through additional implementation one or more of the several innovative systems and methods described in detail in, and incorporated herein by reference from, U.S. Pat. No. 10,658,989 to the present inventor, the disclosure of which is again incorporated by reference herein in its entirety. Alternatively, the person of ordinary skill the art will comprehend, after reading and understanding the present disclosure, how the interference cancellation techniques and structural configuration of architecture 700 may be easily added, in a complementary fashion, one or more of the embodiments above, namely at the input of each signal path split from the respective transceiver. The person of ordinary skill in the art will understand that the reverse is also true, namely, that the equalization techniques of architectures 400, 500, 600 may be readily adapted into the simplified configuration of architecture 700 without requiring significant modification to implement the present interference cancellation and signal equalization techniques together within a single architecture, system component, node component, or as a standalone subsystem.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An interference canceling subsystem for a bidirectional communications network, the subsystem comprising:
   an input interface configured to receive a first data signal from a first transceiver of the bidirectional communications network;
   an output portion configured to receive a second data signal from a second transceiver of the bidirectional communications network;
   a first signal path connecting the input interface to the output portion and configured to relay the first data signal from the input interface to the output portion;
   a second signal path connecting the output portion to the input interface;
   a first interference canceler disposed between the output portion and the input interface along the second signal path, the first interference canceler configured to (i) relay the second data signal from the output portion to the input interface, and (ii) remove portions of the first data signal from the relayed second data signal prior to reaching the input interface;
a second interference canceler disposed between input interface and the output portion along the first signal path, wherein the second interference canceler is configured to (i) relay the first data signal from the input interface to the output portion, and (ii) remove portions of the second data signal from the relayed first data signal prior to reaching the output portion;
a first amplifier disposed along the first signal path between the first interference canceler and the output portion; and
a second amplifier disposed along the second signal path between the second interference canceler and the input interface.

2. The subsystem of claim 1, further comprising a digital-to-analog converter (DAC) disposed along the first signal path between the input interface and the output portion.

3. The subsystem of claim 2, further comprising a first amplifier disposed along the first signal path between a DAC output of the DAC and the output portion.

4. The subsystem of claim 3, further comprising an analog-to-digital converter (ADC) disposed along the second signal path between the output portion and a first echo canceler (EC) input of the first interference canceler.

5. The subsystem of claim 4, further comprising an overload filter disposed along the second signal path between the output portion and an ADC input of the ADC.

6. The subsystem of claim 5, wherein the overload filter is communicatively coupled with the output portion and an amplifier output of the first amplifier.

7. The subsystem of claim 4, wherein a DAC input of the DAC is coupled to a second EC input of the first interference canceler.

8. The subsystem of claim 1, wherein the input interface is coupled with an optical transport medium in operable communication with the first transceiver.

9. The subsystem of claim 8, wherein the output portion is coupled with an electrical radio frequency (RF) transport medium in operable communication with the second transceiver.

10. The subsystem of claim 9, further comprising an electrical-optical interface disposed along the second signal path between the input interface and an echo canceler (EC) output of the first interference canceler.

11. The subsystem of claim 8, further comprising an optical-electrical interface disposed along the first signal path for converting the first data signal from the optical transport medium into a radio frequency (RF) signal prior to reaching the output portion.

12. The subsystem of claim 1, wherein an amplifier input of the first amplifier is coupled with the first interference canceler, an amplifier output of the first amplifier is coupled with the second interference canceler, an amplifier input of the second amplifier is coupled with the second interference canceler, and an amplifier output of the second amplifier is coupled with the first interference canceler.

13. The subsystem of claim 1, wherein the first interference canceler further comprises a first equalizer configured to perform frequency domain equalization on the second data signal.

14. The subsystem of claim 1, wherein the second interference canceler further comprises a second equalizer configured to perform frequency domain equalization on the first data signal.

15. The subsystem of claim 1, wherein the portions of the first data signal comprise one or more of an interference, an echo, a reflection, and a bleed-over signal.

16. An equalization subsystem for a bidirectional communications network transporting a first data signal along an optical transport medium in a first direction and second data signal along the optical transport medium in a second direction opposite the first direction, the subsystem comprising:
a first interface configured to receive the first data signal in the first direction from the bidirectional communications network and output the second data signal in the second direction to the bidirectional communications network;
a second interface configured to receive the second data signal in the second direction from the bidirectional communications network and output the first data signal in the first direction to the bidirectional communications network;
a first amplifier configured to amplify the first data signal prior to output in the first direction to the bidirectional communications network;
a second amplifier configured to amplify the second data signal prior to output in the second direction to the bidirectional communications network; and
an equalizer disposed between the first interface and the second interface, the equalizer configured to (i) remove portions of the first data signal from the second data signal prior to amplification by second amplifier, and (ii) remove portions of the second data signal from the first data signal prior to amplification by first amplifier.

17. The subsystem of claim 16, wherein the equalizer comprises a single equalizer configured for multiple-input/multiple-output operation, and wherein the single equalizer is disposed between the first and second amplifiers.

18. The subsystem of claim 16, wherein the first amplifier is disposed along a first signal path between the first interface and the second interface, wherein the second amplifier is disposed along a second signal path between the first interface and the second interface, wherein the first signal path is separate from the second signal path, and wherein the equalizer comprises (i) a first equalizer unit disposed along the first signal path between first interface and the first amplifier, and (ii) a second equalizer unit disposed along the second signal path between the second interface and the second amplifier.

19. The subsystem of claim 16, wherein the first amplifier is disposed along a first signal path between the first interface and the second interface, wherein the second amplifier is disposed along a second signal path between the first interface and the second interface, wherein the first signal path is separate from the second signal path, wherein the equalizer comprises (i) a first equalizer unit coupled with the first signal path proximate an input to the first amplifier and coupled with the second signal path proximate an output of the second amplifier, and (ii) a second equalizer unit coupled with the second signal path proximate an input to the second amplifier and coupled to the first signal path proximate an output of the first amplifier.

20. A method of equalizing a digital signal, comprising the steps of:
receiving, in the time domain, a sequential series of overlapping data blocks;
transforming the overlapping series of overlapping time domain blocks into at least one compound frequency domain block;

performing frequency domain equalization on the at least one frequency domain block to generate an equalized compound frequency domain block;

transforming the equalized compound frequency domain block into the time domain to generate an equalized compound time domain block;

extracting symbol segments from the equalized compound time domain block to remove overlapping portions of contiguous symbols from each of the symbol segments;

combining the extracted symbol segments to form an equalized symbol stream from the extracted symbol segments; and processing the equalized symbol stream for one or more of amplification, demodulation, recording, and analysis.

\* \* \* \* \*